UNITED STATES PATENT OFFICE.

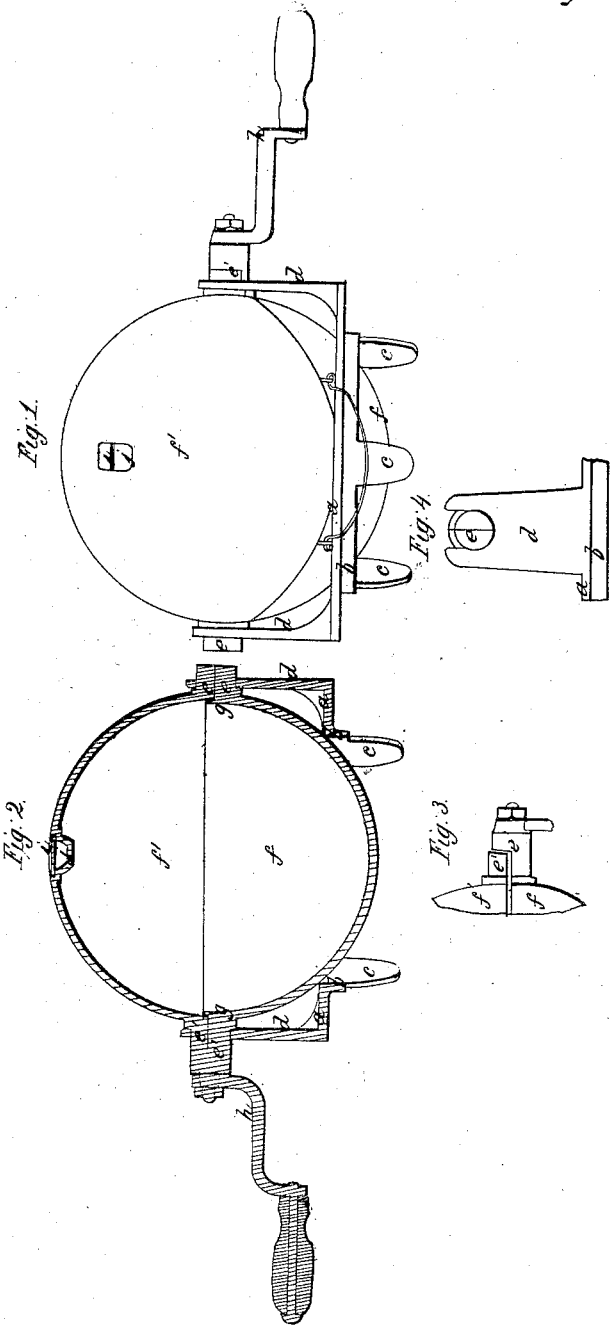

THOMAS R. WOOD, OF CINCINNATI, OHIO.

COFFEE-ROASTER.

Specification of Letters Patent No. 6,345, dated April 17, 1849.

*To all whom it may concern:*

Be it known that I, THOMAS R. WOOD, of Cincinnati, in the county of Hamilton and State of Ohio, have invented new and useful Improvements in Coffee-Roasters; and that the following is a full, clear, and exact description of the principle or character which distinguishes them from all other things before known and of the manner of making, constructing, and using the same, reference being had to the accompanying drawings, making part of this specification, in which—

Figure 1 is an elevation of the apparatus; Fig. 2, a vertical section taken through the axis; Fig. 3, a side view of one of the journals, and Fig. 4, an end view of the other journal within the box.

The same letters indicate like parts in all the figures.

The object of my invention for roasting coffee is to adapt the apparatus to the boiler holes of cooking stoves, ranges, and furnaces, instead of requiring a separate furnace as heretofore, by which I attain the end desired at less cost and with more convenience than by any plan previously practiced, at the same time producing an apparatus that will toast or roast coffee with more regularity.

Instead of making the vessel which holds the coffee of a cylindrical form, my invention consists in making it of a spherical form for the purpose of adapting it to the usual form of boiler holes in cooking stoves, ranges, and furnaces, and at the same time to insure the toasting of the coffee more regularly than can be effected in a rotating cylindrical vessel in which the layer of coffee is as thick at the ends as in the middle, the heat at these points being less, whereas in the spherical form the layer of coffee will be thickest in the center where the heat is the most intense and gradually less all around as the surface recedes from the fire.

My invention also consists in making this spherical vessel in two parts, one fitting onto a rim on the other, when the journals of the vessel are made in two parts half of each on each semi-sphere, so that when they turn in the open boxes of the standards of the frame the two halves will be held together and thus prevent the vessel from opening except when the movable half is vertically above the other; when thus placed the upper end of the box being open will admit of freely removing it. And finally my invention consists in combining with such a rotating toaster a circular rim through which a portion of the sphere projects to be acted on by the fire, which rim is adapted to the boiler hole or holes of cooking stoves, ranges, furnaces, &c., the said rim being provided with standards in which the journals of the rotating vessel turn.

In the accompanying drawings (*a*) represents a cast iron rim adapted to, and which may fit into any of the circular boiler holes of a cooking stove, range, or furnace, from the inner periphery of which a flange (*b*) projects downward to enter the boiler hole, and at three or more points this flange extends downward far enough to form feet (*c, c, c*) for the apparatus to rest on when placed on the floor. Two standards (*d, d*) project upward from the rim (*a*) in the upper ends of which are formed open boxes to receive the journals (*e, e'*) of the rotating coffee toaster (*f*), the boxes being open at top to admit of removing the toaster from the rim when desired. This toaster is made spherical and cast in two equal parts (*f*) and (*f'*), the edge of the one (*f*) being provided with a flange (*g*) inside to fit into the other. The journals (*e, e'*) are cast the half of each onto each of the semi-spheres so that when the two are put together the two journals will be complete; but the part of the journal (*e'*) on the semi-sphere (*f*) is made longer than on the other and is enlarged to receive a crank handle (*h*) by means of which the spherical toaster can be turned when placed on the fire to toast the coffee. The semi-sphere (*f'*) is cast with a thumb and finger piece (*i*) in a recess (*j*) by means of which this half of the toaster can be lifted off to have access to the inside of the toaster.

The rim (*a*) is provided with a bail (*k*) on each side by means of which it can be carried. From the foregoing it will be seen that when the half (*f'*) of the sphere is vertically above the other half (*f*), that it can be taken off and put on as the boxes in which the journals turn are open at top; and it will also be seen that during a part of the rotation of the spherical toaster that half which is above is kept down by its weight, and during the other portions the two parts are kept together by the vertical sides of the boxes that hold together the divided journals.

The two parts of the spherical toaster are cast separately, as also the rim with the standards, flange, and legs as represented in the accompanying drawings.

What I claim as my invention and desire to secure by Letters Patent is—

1. Making the coffee toasted in a spherical form provided with journals, in combination with a rim adapted to the form thereof, substantially as described, whereby it can be adapted to the curved boilerholes of cooking stoves, ranges, furnaces, &c, and by which also it is adapted to the toasting of coffee more regularly than any other apparatus heretofore known.

2. I also claim making the spherical toaster in two parts substantially as described in combination with the divided journals, as described, whereby the two parts can be separated and put together without the necessity of fastenings, as described.

THOS. R. WOOD.

Witnesses:
JOHN WRIGHT,
JOS. H. RUMAR, Jr.